Figure 1:
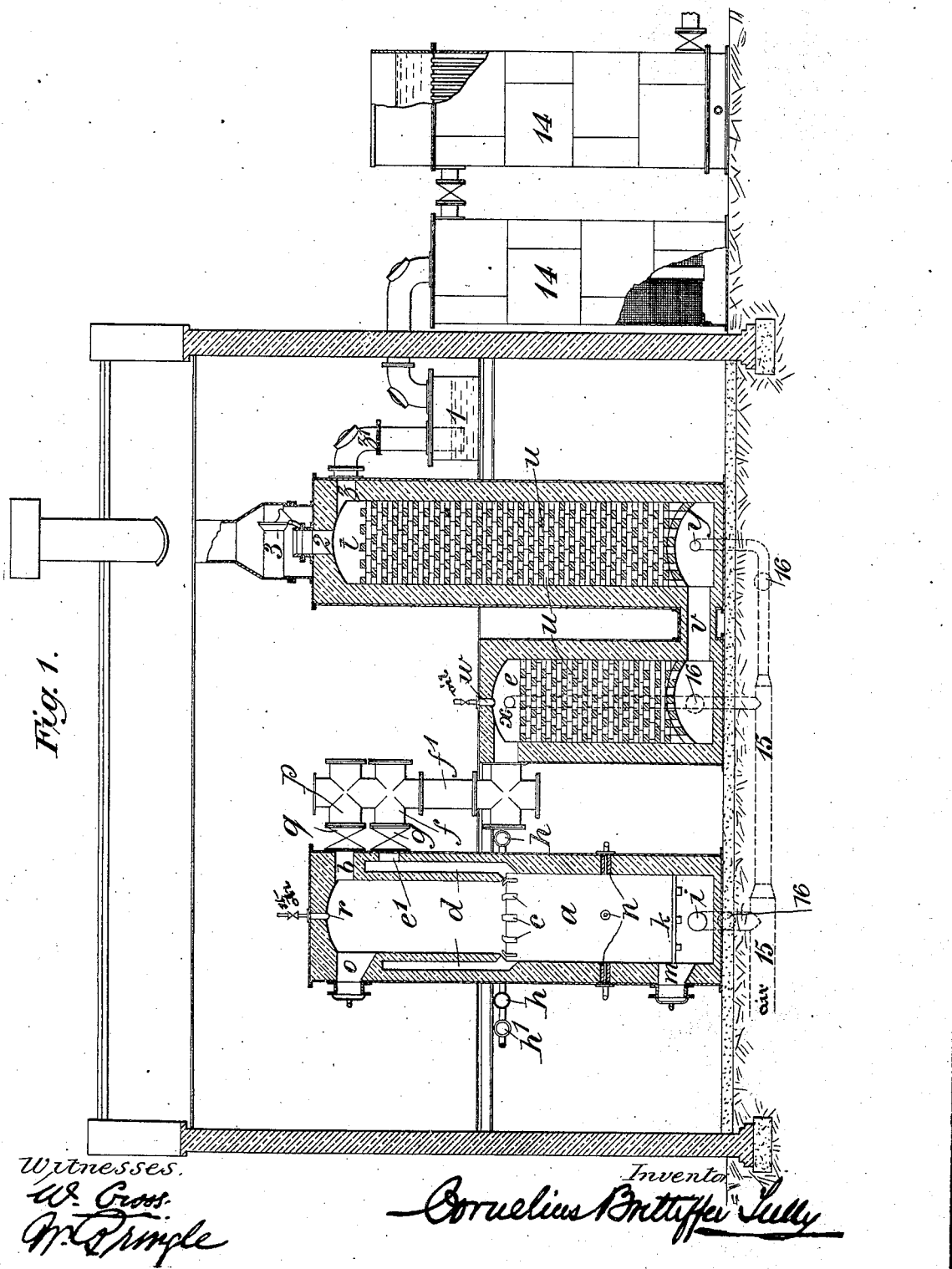

C. B. TULLY.
METHOD OF MANUFACTURING GAS.
APPLICATION FILED JULY 6, 1906.

938,919.

Patented Nov. 2, 1909.
3 SHEETS—SHEET 1.

Witnesses.
W. Cross.
M. Pringle.

Inventor
Cornelius Bittiffer Tully

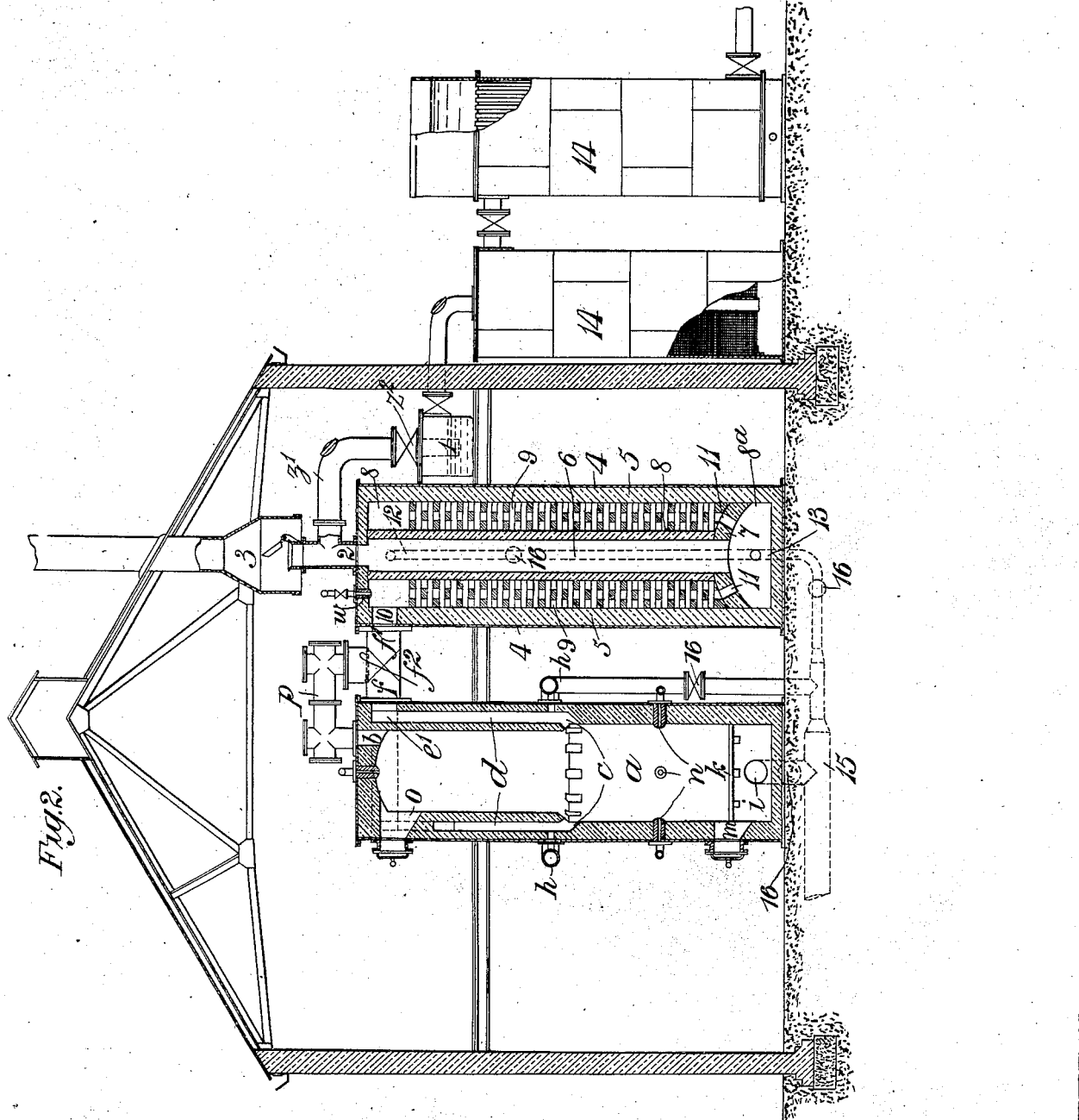

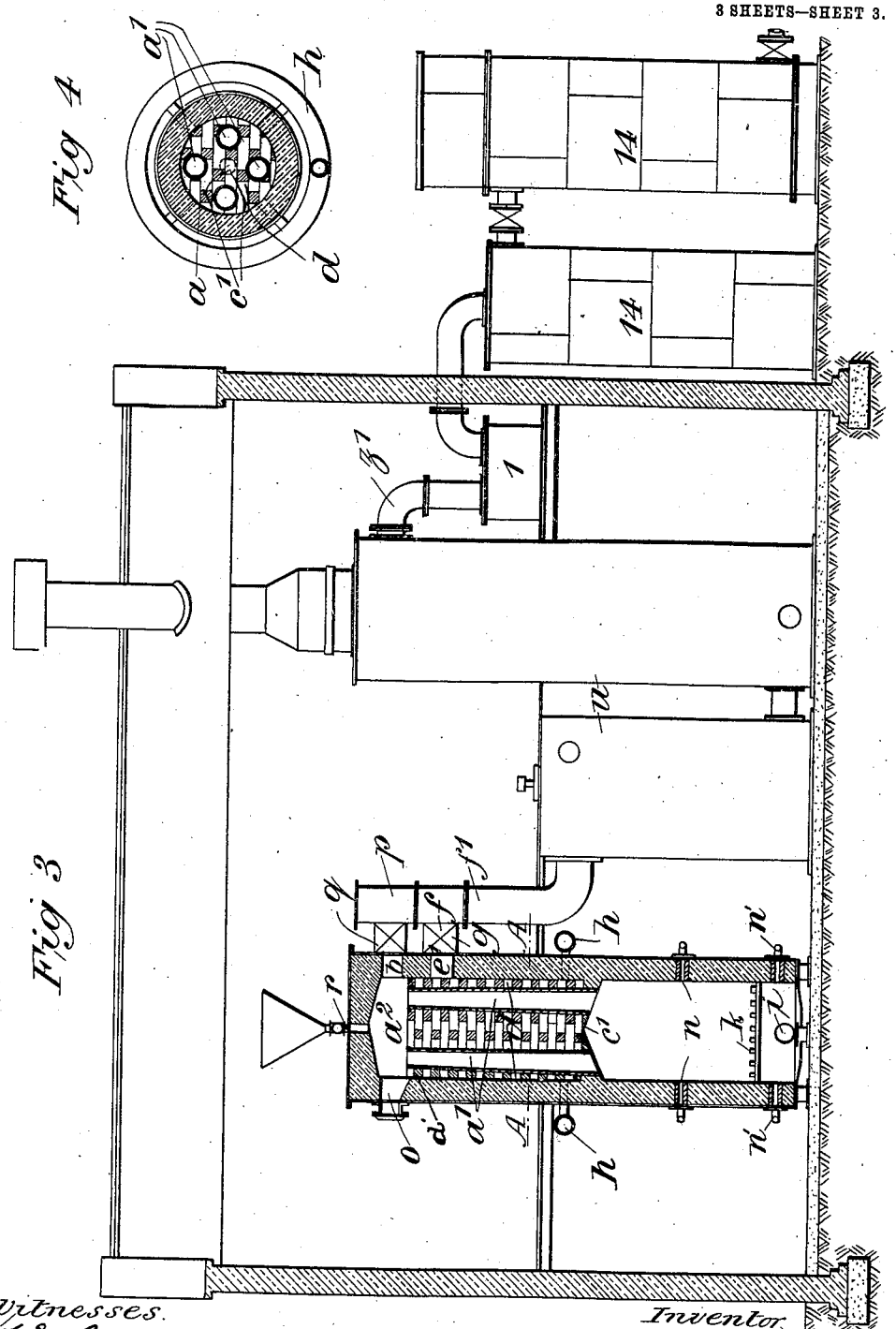

_UNITED STATES PATENT OFFICE._

CORNELIUS BRITTIFFEE TULLY, OF WOOD GREEN, LONDON, ENGLAND.

METHOD OF MANUFACTURING GAS.

938,919.  Specification of Letters Patent.  Patented Nov. 2, 1909.

Application filed July 6, 1906. Serial No. 324,965.

*To all whom it may concern:*

Be it known that I, CORNELIUS BRITTIFFEE TULLY, a subject of the King of Great Britain and Ireland, residing at Wood Green, in the county of London, England, have invented Improvements in Methods of Manufacturing Gas, of which the following is a specification.

In the manufacture or production of carbureted water gas suitable for heating and lighting purposes, it is now common to first raise a mass of ignited coke, or other suitable carbonaceous fuel, to a state of incandescence in a gas producer by blowing air through it, and to pass the resulting combustible gas into carbureting and superheating or fixing chambers wherein it is burned by admixture with air so as to heat such chambers to a high temperature, the resulting products of combustion being discharged into the external atmosphere past a snift valve. When the fuel has been thus raised to a suitably high degree of incandescence, and the carbureting and superheating chambers have been heated to a sufficiently high temperature, the supply of air to the gas producer and chambers is shut off, the snift valve closed, and steam injected into the mass of incandescent fuel in the gas producer, the resulting water gas formed during this portion of the process being led upward through the solid fuel to the top of the gas producer whence it is led into the top of the carbureting chamber into which oil, such as crude petroleum, paraffin and the like, designed for carbureting the gas, is simultaneously sprayed, the gas and oil being led through the carbureting chamber wherein the oil is decomposed and the resulting gaseous products intimately mixed with the water gas, the mixture flowing onward through the carbureting and superheating chambers wherein the condensable portion of the mixture is more or less fixed, *i. e.*, converted into permanent gas, and the resulting carbureted water gas being then led through a hydraulic box and gas purifying apparatus into a gas holder.

Now the present invention has reference to various improvements in or relating to the manufacture or production of carbureted water gas, all as hereinafter more particularly described and pointed out in the claims.

In the ordinary method of manufacturing carbureted water gas hereinbefore described, more oil and solid fuel are consumed than is desirable from an economical point of view, and the gas passing from the carbureting and superheating portions of the plant contains much tar or other heavy hydrocarbon that has to be separated therefrom in the purifying apparatus and forms a by product that is not utilized in the manufacture of the gas and for which there is little demand on the market.

Now an object of the present invention is to manufacture gas suitable for heating and illuminating purposes in such a way as to admit of a large quantity of tar or other heavy hydrocarbon, which is comparatively cheap, and less oil and coke or other solid fuel, which are comparatively dear, being used than heretofore usual in the manufacture of a given volume of gas of the kind referred to, and also to enable a cleaner and better gas to be discharged from the carbureting and superheating portion of the plant than usual, so as to throw less work on the purifying apparatus and permit the same to continue working for longer periods of time, without cleaning, than is ordinarily the case, and in this way cheapen and improve the manufacture of gas of the kind referred to. For this purpose during the preliminary or blowing up stage of the process of manufacturing gas according to this invention, air is caused to pass through only the lower portion of the mass of solid fuel in a gas generator, say for example through about one half the height of the mass of fuel, which is thereby raised to a state of incandescence, and the resulting combustible gas, after leaving the fuel, is mixed with air and partially burned in proximity to but out of contact with the upper portion of the mass of fuel, as by burning it in a jacket or chamber surrounding such upper portion of the fuel, so as to heat such fuel to a high temperature without causing combustion thereof, and tar or other heavy hydrocarbon (hereinafter referred to as tar) is simultaneously supplied to the upper portion of the top part of the upper fuel thus heated, so as to become decomposed thereby, the solid products of the decomposition being deposited in the fuel, and the gaseous or vaporous portion thereof being caused to flow downward and mix with the combustible gas flowing off from the lower incandescent portion of the fuel and also become partly burned therewith, the highly heated products of incomplete combustion being thence led into the carbureting and superheating portions of the plant, wherein the combustion is completed by addition of more air and such portion of plant raised to a very high temperature, the products of complete combustion finally escaping into the external atmosphere, as before, past a snift valve.

After the above described preliminary or blowing up stage of the process has continued for a sufficient time to raise the lower portion of the fuel to the required degree of incandescence, and the carbureting and superheating portion of the plant to a suitably high temperature, the supply of air to the gas generating, carbureting and superheating portions of the plant is cut off, the snift valve closed, and the exit of gas from between the lower and upper portions of fuel in the gas generator prevented. Steam and tar are then injected into the lower incandescent portion of the fuel, and oil is sprayed into the top of the carbureting portion of the plant, tar being still supplied to the upper heated portion of the mass of fuel through which the combustible gases resulting from the decomposition of the steam and tar by the incandescent portion of the fuel simultaneously flow in an upward direction and in which solid products of the said decomposition are arrested, the said gaseous products of decomposition together with the gaseous or vaporous products of decomposition of the tar, supplied to the upper heated portion of the fuel, passing on together into the carbureting portion of the plant where they become mixed with the products resulting from the decomposition of the oil simultaneously entering that portion of the plant. The gaseous mixture then flows through the highly heated carbureting and superheating portion of the plant wherein it is fixed and the resulting gas is led through a hydraulic box and purifying apparatus, that may be of ordinary construction, into a gas holder. The injection of the steam and tar may be continued for from six to eight minutes according to the heat of the generator. The tar, in practice, is shut off about one minute or so before the steam to allow the plant to become clear of tar. In this way a large quantity of tar, for example carbureted water gas tar, or coal gas tar, and a relatively small quantity of oil, can be employed in the manufacture of heating and illuminating gas of good quality, and, owing to the continuous deposition of solid carbon among the coke or other solid fuel in the gas producer, resulting from the decomposition of the tar, the consumption of such solid fuel will be retarded and less of it burned, the result of the improved process being that the cost of manufacture of the gas will be considerably reduced as compared with the ordinary mode of manufacture.

The upper portion of the gas generator surrounded by the jacket or combustion chamber, forms a retort that contains a deep column of solid fuel. In some cases, the said retort may be replaced by two or more retorts that are surrounded by the combustion chamber and communicate at the bottom with the top of the fuel chamber in the lower part of the gas generator and at the top with the chamber at the upper end of the generator into which solid fuel is fed and which is provided with the outlet through which the water gas is led direct to the carbureting and superheating chambers.

The production in the upper part of the gas generator of one or more deep columns of highly heated solid fuel through which the water gas produced in the lower incandescent portion of fuel is caused to flow and thence at once passed to the carbureting and superheating portion of the plant, also admits of a better quality of carbureted water gas being produced, than heretofore, in those cases where the water gas is produced in the usual way by simply injecting steam, without tar, into the lower incandescent portion of the fuel.

In the accompanying illustrative drawings, Figure 1 shows partly in vertical section and partly in side elevation, apparatus that is mainly of the kind heretofore employed for the manufacture of carbureted water gas but modified to enable such manufacture to be carried out in the improved manner hereinbefore described. Fig. 2 is a similar view to Fig. 1 showing a modified construction. Fig. 3 is a similar view to Fig. 1 and Fig. 4 a cross section on the line A A of Fig. 3, showing a further modified construction.

In carrying out the invention hereinbefore described, it is preferred to use a gas generator $a$ the upper portion of which is constructed, as heretofore, with a surrounding annular combustion chamber or jacket $d$ that is in communication at the lower end with the interior of the gas generator through a series of openings $c$ arranged between the top and bottom of the generator, and at the top is adapted to be placed in communication with the top of a carbureting chamber $e$ by an outlet $e^1$, a connecting pipe $f$ provided with a valve $g$, and a pipe $f^1$. To the jacket $d$ is connected an air supply pipe $h$ with valve for admitting the necessary air for burning part of the gases entering the jacket from the gas generator, as and for the purpose hereinbefore described, the temperature at which the apparatus is worked being such, say about 2000° F. (two thousand degrees Fahrenheit), as to cause automatic ignition of the gas when the air supply is turned on. The upper end of the gas generator $a$ is, in addition to the normally closed solid fuel inlet *o*, provided with a gas outlet *b*, that is also adapted to be placed in direct communication with the top of the carbureting chamber *e* through a pipe, such as *p* with valve *q*, and the pipe *f¹*, and with means, such as one or more steam nozzles *r*, for injecting tar on to the top of the fuel in the said upper portion of the gas generator *a*. The gas outlet pipe *p* from the top of the gas generator *a* may, if desired, and as shown in Fig. 2, be connected to the gas outlet pipes *f* and *f¹* from the jacket *d*, and the two pipes *p* and *f* be controlled by a single two-way valve at *f²*, instead of by the two valves *g* and *q*. The lower portion of the gas generator may be of uniform diameter, as shown, and is provided at the bottom, as heretofore, with one or more inlets *i* for air and steam, with a grate or hearth *k*, and with a stirring hole *m*, inlets *n* for steam and tar being arranged about midway between the grate or hearth *k* and the openings *c*.

The working of the apparatus is as follows:—During the preliminary or blowing up stage of process of gas manufacture, the valve *g* is open, and the valve *q* closed, so that the combustible gases produced when raising the lower portion of the fuel in the gas generator to incandescence by the air blown therein will pass through the openings *c* into the jacket *d* and thence to the carbureting chamber *e*. Air is simultaneously admitted to the jacket *d* by the pipe *h* so as to burn some of the gases in the jacket and raise the fuel in the upper part of the generator to a high temperature, and tar is simultaneously injected through the nozzle or nozzles *r* on to the top of the said heated fuel, the solid products of decomposition of such tar being deposited in the fuel while the gaseous or vaporous products pass downward through the fuel and flow with the ascending gases from the lower portion of fuel through the openings *c* into the jacket *d*. The supply of air in the jacket *d* and to the incandescent fuel is afterward cut off and steam and tar, injected into the incandescent fuel through the inlets *n* and *n'* respectively in the lower part of the generator for the production of carbureted water gas. During the production of the carbureted water gas the valve *g* is closed and the valve *q* is open, but tar is still injected on to the top of the heated mass of fuel in the upper part of the gas generator through which the gaseous products resulting from the decomposition of the steam and tar injected into the lower incandescent mass of fuel flow in an upward direction and in which the solid products of such decomposition are arrested, while the gaseous and vaporous products of decomposition of the tar injected on to the upper heated portion of the fuel will become mixed with the first mentioned gaseous products in the upper part of the generator, the gaseous and vaporous mixture thence flowing off through the outlet *b*, pipe *p*, valve *q* and pipe *f¹* direct to the carbureting chamber *e*. In this way the gaseous and vaporous products of decomposition of the tar admitted to the top of the gas generator are prevented from being injured by excessive heating and are made available for carbureting or enriching the water gas.

In the construction shown in Figs. 3 and 4, the upper part of the gas generator *a* is provided with several retorts *a¹* that extend through the bottom and top of the combustion chamber *d* and open into the lower part of the generator designed to contain the lower portion of the fuel, and also into the upper fuel supply chamber *a²*, the said retorts being designed to provide several deep columns of highly heated fuel. The retorts are preferably made slightly conical to facilitate the passage of solid fuel therethrough in a downward direction into the lower portion of the generator. The openings *c¹* between the gas generator *a* and the combustion chamber *d* are formed in the bottom wall of such chamber. The combustion chamber *d* may advantageously be charged with means, such as checkerwork *d¹*, that will act to store up the heat received from the hot gases during the blowing up stage of the process and maintain the retorts *a¹* and the fuel therein at a high temperature during the gas making operation proper. *n¹* are nozzles for admitting steam to the lower end of the gas generator. In other respects the arrangement is or may be like that shown in Fig. 1. When it is desired to produce water gas alone in the lower portion of the gas generator, the supply of tar to the incandescent fuel by injection with steam is omitted, and the water gas, produced by the injection of steam alone, is caused to flow upward, through the columns of fuel in the retorts *a¹*, previously heated to a high temperature and is thence led by the outlet *b*, valve *q* and pipes *p* and *f¹* to the carbureting chamber *e* as in the arrangement shown in Fig. 1, tar being simultaneously supplied through the nozzles *r* to the highly heated columns of fuel in the retorts, or not, as may be desired. Even if the tar be omitted, the quality of the water gas will be improved by passing through the highly heated upper mass of fuel.

When making carbureted water gas in the manner hereinbefore described, the gas delivered from the gas generator to the carbureter and superheater will usually not need to be further carbureted by simultaneously spraying oil into the carbureting chamber *e*.

According to an alternative method of making carbureted water gas according to this invention, water gas is produced by injecting steam alone, or steam and tar, into the lower incandescent mass of fuel and passing the resulting gas through the combustion chamber $d$, valve $g$, and pipes $f$ and $f^1$ to the carbureting chamber $e$ and simultaneously supplying tar to the top of the highly heated fuel in the retorts $a^1$ so that it will be decomposed thereby, and passing the resulting gaseous and vaporous products of decomposition downward through the columns of heated fuel, as when blowing up, and leading them upward through the combustion chamber $d$ so as to cause them to become converted into a more or less permanent gas which is caused to flow on with the water gas into the carbureting chamber $e$ where the mixed gases are carbureted by the simultaneous admission of oil to such chamber, the resulting products passing through the superheater, as before, for fixing the gas. In this case the outlet $b$ from the top of the generator $a$ is closed. When, toward the close of such a gas making stage, the oil is shut off from the carbureting chamber to allow of such chamber and superheating chambers being freed from oil previous to again heating these chambers to a high temperature, the valve $g$ may be closed and the valve $q$ opened so that the carbureted water gas resulting from the decomposition of steam, or steam and tar, in the lower part of the fuel will pass upward through the upper heated columns of fuel and mix with the gaseous and vaporous products of decomposition of the tar admitted to the top of the generator and the mixed products led direct to and passed through the carbureting and superheating chambers without admission of oil, according to the method first hereinbefore described. By this means the water gas produced during the latter portion of the gas producing stage will be caused to pass through a greater depth of heated fuel than would otherwise be the case and improve the quality of the gas produced. By means of the apparatus described, carbureted water gas can be produced, at will, in either of the ways described. Or it may be produced during one stage in the one way and in another stage by the other way, so as to produce carbureted water gas of any desired illuminating power.

The carbureting and superheating portion of the plant may, as shown in Fig. 1, consist as usual, of two chambers, viz. a carbureting chamber $e$ and a superheating chamber $t$, charged with refractory brickwork $u$, and connected together at their lower ends by a passage $v$.

The upper end of the carbureting chamber $e$ is provided with means, such as a nozzle $w$ and air pipe $x$, as usual, for separately introducing oil and air thereto, and the superheating chamber $t$ is provided at the bottom with an inlet $y$ for air and at the top with a gas outlet $z$ in connection by a pipe $z^1$ with a hydraulic box 1, and with a gas outlet 2 controlled by a snift valve 3, whereby it can be placed in connection with the external atmosphere. It is preferred however to employ, when convenient, and as shown in Fig. 2, a combined carbureting and superheating device comprising an outer cylindrical vertical casing 4 having a lining 5 of refractory material, and an inner tube 6 of refractory material that is supported at its lower end by a perforated arch or false bottom 7 and is arranged centrally within the casing 4 so as to form therewith an annular chamber 8 that is charged with firebricks 9 arranged checkerwise. The upper portion of the chamber 8 is formed with a lateral inlet 10 that is adapted to be connected to the gas outlets $b$ or $e^1$, at will, of the gas generator $a$ through the pipes $f$ or $p$ and the two-way valve at $f^2$, and is provided at the top with means, which may be of the usual kind, such as a nozzle $w$, for spraying oil into it. The lower end of the chamber 8 is in communication through the perforations 11 in the said arch or false bottom 7 with a supplementary chamber $8^a$ formed between the same and the true bottom of the casing 4—5 and with which the lower end of the inner tube 6 communicates. The upper end of the tube communicates with an outlet pipe 2 that is provided with a snift valve 3 for placing it in communication with the external atmosphere, and is connected laterally to a pipe $z^1$ that is provided with a valve $z^2$ and dips into an ordinary hydraulic box 1. The upper end of the main chamber 8 and the lower supplementary chamber $8^a$ are provided with valve controlled air inlet pipes 12 and 13 respectively. This combined carbureting and superheating apparatus acts in the same manner as the separate carbureter and superheater shown in Fig. 1 but is more compact and cheaper. In each arrangement the gas purifying apparatus shown at 14 and connected to the hydraulic box 1, may be of the ordinary kind. 15 is an air supply main, and 16 are valves for controlling the supply of air therefrom to the gas generator and the various chambers to which the air is to be supplied.

As will be obvious, the improvements in the manufacture of carbureted water gas hereinbefore described can be carried out in apparatus of various constructions.

What I claim is:—

1. A method of manufacturing gas which consists, in the blowing up or preliminary stage, in raising the lower ignited portion of a mass of fuel to a state of incandescence by blowing air through it, burning some of the resulting combustible gases to heat an upper portion of the mass of fuel to a high temperature without allowing the burning gases to come into contact with such fuel and simultaneously supplying liquid hydrocarbon to the top part of the upper highly heated portion of the mass of fuel.

2. A method of manufacturing gas which consists, in the blowing up or preliminary stage, in raising a lower ignited portion of a mass of fuel to a state of incandescence by blowing air through it, burning some of the resulting combustible gases to heat an upper portion of the mass of fuel to a high temperature without allowing the burning gases to come into contact with such fuel, simultaneously supplying liquid hydrocarbon to the top part of the upper highly heated portion of the mass of fuel and causing resulting gaseous products of decomposition to pass downward through such fuel portion and escape with the combustible gases escaping from the lower fuel portion.

3. A method of manufacturing gas which consists in the blowing up or preliminary stage, in raising a lower ignited portion of a mass of fuel to a state of incandescence by blowing air through it, and burning some of the resulting combustible gases to heat an upper portion of the mass of fuel to a high temperature without allowing the burning gases to come into contact with such fuel, and, in the subsequent gas making stage, cutting off the supply of air to the lower incandescent portion of the fuel mass, injecting gas producing fluid into the mass of such lower portion of incandescent fuel intermediately of the upper and lower ends thereof and causing the resulting gases of decomposition to pass upwardly and be heated by the upper highly heated portion of the fuel mass.

4. A method of manufacturing gas which consists, in the blowing up or preliminary stage, in raising a lower ignited portion of a mass of fuel to a state of incandescence by blowing air through it, burning by the aid of a supplementary air supply some of the resulting combustible gases to heat an upper portion of the mass of fuel to a high temperature without allowing the burning gases to come into contact with such fuel, and, in the subsequent gas making stage, cutting off the supply of air to the lower incandescent portion of the fuel mass, injecting hydrocarbon with steam into the mass of such lower portion of incandescent fuel intermediately of its upper and lower ends and causing the combustible gases thereby produced to pass upwardly and be heated by the upper highly heated portion of the fuel mass.

5. A method of manufacturing gas which consists, in the blowing up or preliminary stage, in raising a lower ignited portion of a mass of fuel to a state of incandescence by blowing air through it, burning some of the resulting combustible gases to heat an upper portion of the mass of fuel to a high temperature without allowing the burning gases to come into contact with such fuel and simultaneously supplying liquid hydrocarbon to the top part of the upper highly heated portion of the fuel mass, and, in the subsequent gas making stage, cutting off the supply of air to the lower incandescent portion of the fuel mass, injecting gas producing fluid into such incandescent fuel, and causing the resulting gases of decomposition to pass upwardly and be heated by the upper highly heated portion of the fuel mass.

6. A method of manufacturing gas which consists, in the blowing up or preliminary stage, in raising a lower ignited portion of a mass of fuel to a state of incandescence by blowing air through it, burning some of the resulting combustible gases to heat an upper portion of the mass of fuel to a high temperature without allowing the burning gases to come into contact with such fuel, and simultaneously supplying liquid hydrocarbon to the top part of the upper highly heated portion of the fuel mass for decomposition into gaseous and vaporous products and, in the subsequent gas making stage, cutting off the supply of air to the lower incandescent portion of the fuel mass, continuing the supply of liquid hydrocarbon to the upper portion of the fuel mass, injecting gas producing fluid into the incandescent fuel and causing the resulting gases of decomposition to pass upward and be heated by the upper portion of the highly heated fuel mass simultaneously with the gaseous products of decomposition obtained in such mass.

7. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, cutting off the supply of air to the lower mass of incandescent fuel, injecting steam into the mass of such lower portion of incandescent fuel intermediately of its upper and lower ends, causing the resulting water gas to pass upward through the upper heated mass of fuel, and carbureting and superheating such gas.

8. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, simultaneously supplying heavy hydrocarbon to the upper highly heated mass of fuel and causing resulting gaseous products of decomposition to pass downward through such mass of fuel and escape with the combustible gases escaping from the lower mass of fuel, cutting off the supply of air to the lower incandescent mass of fuel, injecting steam into such incandescent fuel, causing the products of decomposition of the steam to flow through the upper heated mass of fuel, and carbureting and superheating the escaping gas.

9. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, cutting off the supply of air to the lower incandescent mass of fuel, injecting steam into such incandescent fuel and supplying heavy hydrocarbon to the upper highly heated mass of fuel, causing the gaseous products of decomposition of the steam to pass through the upper heated mass of fuel and become mixed with the gaseous and vaporous products of decomposition of the hydrocarbon, and superheating the mixture.

10. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, simultaneously supplying heavy hydrocarbon to the upper highly heated mass of fuel and causing resulting gaseous products of decomposition to pass downward through such composition of fuel and escape with the combustible gases escaping from the lower mass of fuel, cutting off the supply of air to the lower incandescent mass of fuel, injecting steam into such incandescent fuel and simultaneously supplying liquid hydrocarbon to the upper heated mass of fuel, causing the gaseous products of decomposition of the steam to pass upward through the upper heated mass of fuel and become mixed with the gaseous and vaporous products of decomposition of the hydrocarbon, and superheating the mixture.

11. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, cutting off the supply of air to the lower incandescent mass of fuel, injecting steam and tar into such incandescent fuel, passing the resulting products of decomposition through the upper heated mass of fuel, and superheating the gas passing from such fuel.

12. A method of manufacturing carbureted water gas, said method consisting in raising a lower mass of fuel to a state of incandescence by blowing air through it, burning some of the resulting combustible gases to heat an upper mass of fuel to a high temperature without allowing the burning gases to come into contact with such fuel, cutting off the supply of air to the lower incandescent mass of fuel, injecting steam and tar into such incandescent fuel, passing the resulting products of decomposition through the upper heated mass of fuel, and carbureting and superheating the gas passing from such fuel.

Signed at London, England this 25th day of June 1906.

CORNELIUS BRITTIFFEE TULLY.

Witnesses:
 EDWARD HITT,
 FREDK. L. RAND.